United States Patent [19]

Lejcek

[11] Patent Number: 4,860,031

[45] Date of Patent: Aug. 22, 1989

[54] REGISTER TAPE TRANSPORT DEVICE

[75] Inventor: Franz Lejcek, Vienna, Austria

[73] Assignee: Goerz Electro Gesellschaft m.b.H., Vienna, Austria

[21] Appl. No.: 654,098

[22] Filed: Sep. 24, 1984

[30] Foreign Application Priority Data

Sep. 22, 1983 [DE] Fed. Rep. of Germany ....... 3334217

[51] Int. Cl.[4] .................. G01D 15/24; G01D 15/00
[52] U.S. Cl. ............................ 346/136; 346/145; 358/296
[58] Field of Search ............... 346/136, 145, 76 PH; 358/296

[56] References Cited

U.S. PATENT DOCUMENTS

| | | | |
|---|---|---|---|
| 4,127,858 | 11/1978 | Schiller | 346/136 |
| 4,223,325 | 9/1980 | Ebert | 346/145 |
| 4,377,813 | 3/1983 | Grossman et al. | 346/136 X |

FOREIGN PATENT DOCUMENTS

| | | | |
|---|---|---|---|
| 145270 | 8/1983 | Japan | 358/296 |
| 146173 | 8/1983 | Japan | 358/296 |

*Primary Examiner*—E. A. Goldberg
*Assistant Examiner*—Mark Reinhart
*Attorney, Agent, or Firm*—Herbert L. Lerner; Laurence A. Greenberg

[57] ABSTRACT

A transport device for a register tape of an electric register mechanism having a housing containing a supply load unit into which a supply roller serving for unwinding the register tape is insertable, and a transport roller which, together with a contact pressure roller, grips a register tape running between both the transport roller and the contact pressure roller and passes it from the supply roller unit to and beyond a register element of the register mechanism for performing a recording on the register tape, the supply load unit being at least partly removable from the housing for inserting the supply roller therein, the supply roller and the contact pressure roller being spatially separated from one another during the removal of the supply load unit includes means defining a contact pressure surface, the register element being at the contact pressure surface, the transport roller, in operating position thereof, being located between the contact pressure roller and the contact pressure surface, the transport roller being shifted out of the operating position thereof when the supply load unit is removed at least partly from the housing, and the register tape pressed between the contact pressure roller and the contact pressure surface being freed therefrom.

1 Claim, 3 Drawing Sheets

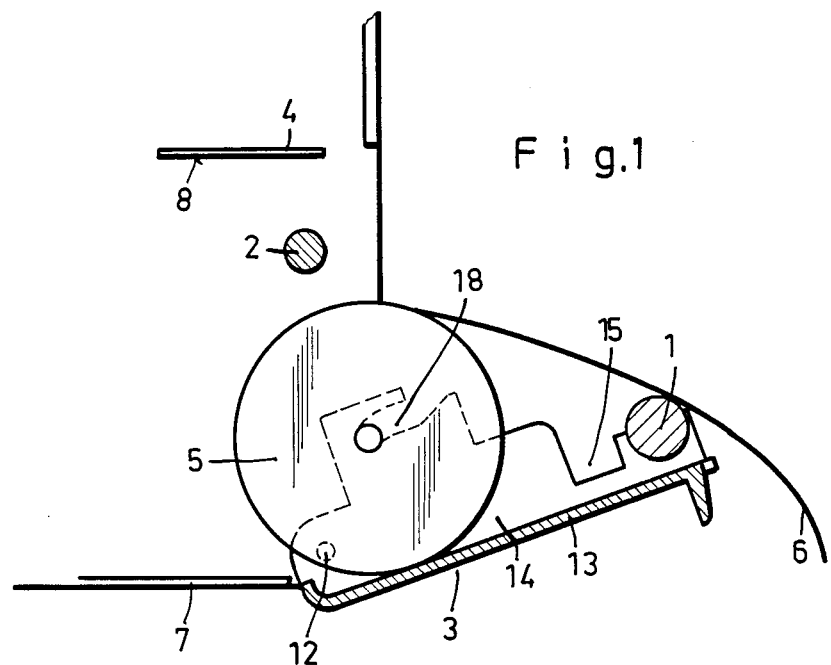
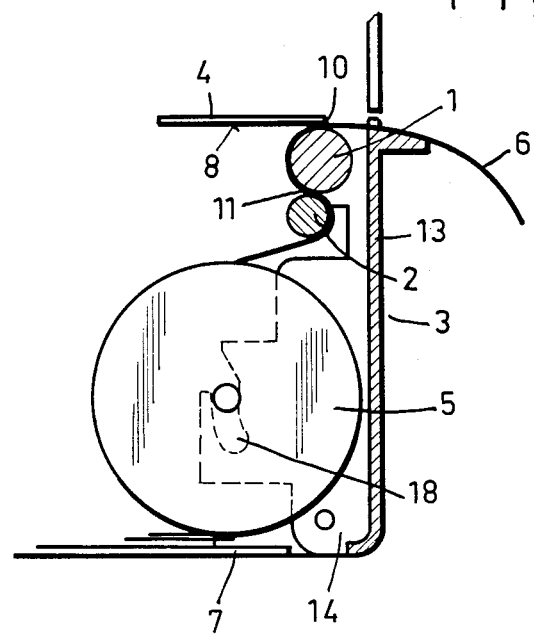

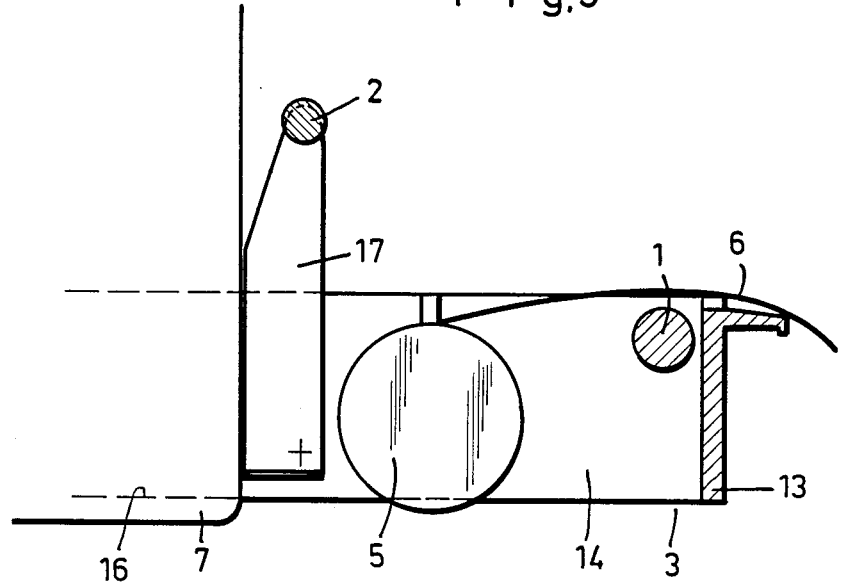
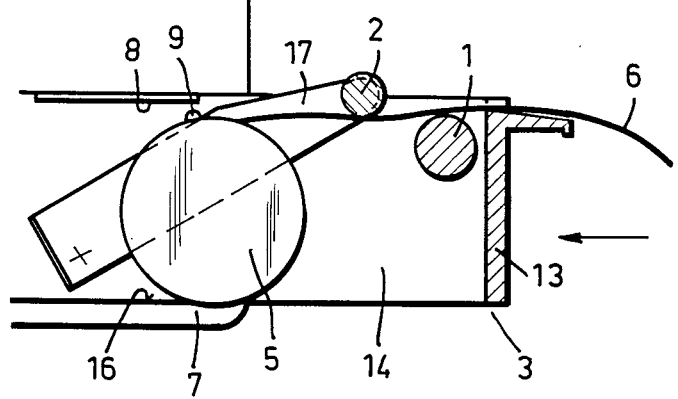

REGISTER TAPE TRANSPORT DEVICE

SPECIFICATION

The invention relates to a transport device for register tapes of an electric register mechanism and, more particularly, to such a transport device having a housing containing a supply load unit into which a supply roller serving for unwinding the register tape is insertible, and a transport roller which, together with a contact pressure roller, grips a register tape running between both the transport roller and the contact pressure roller and passes it from the supply roller unit to and beyond a register element of the register mechanism for performing a recording on the register tape, the supply load unit being at least partly removable from the housing for inserting the supply roller therein, the supply roller and the contact pressure roller being spatially separated from one another during the removal of the supply load unit.

In modern register mechanisms, the transport device is not only supposed to ensure a neat recording or printing, but also primarily is user-friendly. The expanded use of register mechanisms results in the operation thereof by personnel which are not technically versed. It is not to be expected with such personnel that the register tape must first be threaded in with great detail when introducing a new supply roller.

From European Pat. No. 0 002 255, a register mechanism is known which is provided with a supply load unit for receiving the supply roller for the register tape, the supply load unit being removable from the housing of the register mechanism. Not only is the insertion of a new supply roller facilitated thereby, but also the threading-in of the register tape between the transport roller and the contact pressure roller is avoided by building-in the contact pressure roller into the supply load unit and, thereby, when the supply load unit is removed from the housing, the transport roller does not block the way. When the transport or supply load unit is re-inserted into the housing, the register tape is seized by the transport roller and pressed against the contact pressure roller so that required friction is produced for transporting the register tape.

The aforedescribed as well as other similarly constructed transport devices of the prior art have a disadvantage in that the register tapes are fed over mostly a plurality of diverting or deflecting rollers or edges to the recording or printing element and therefrom to the drive system formed of the transport roller and the contact pressure roller. The construction of the conventional transport devices is thus not only relatively complicated, but also always demands, nevertheless, a given expertise when inserting a new supply roller. It is furthermore disadvantageous that the drive system draws the register tapes past the recording or printing element, the latter consequently lying forward of the drive system, as viewed in transport direction of the registeer tape. The register tape can, however, first emerge from the housing behind the drive system, so that the recording or printing is visible only after considerable delay.

It is accordingly an object of the invention to provide a transport device generally of the foregoing type which is of especially simple construction due to the omission of auxiliary diversion or deflecting rollers and, thereby also simple to operate, and which permits the record or printing to be visible directly after the recording or printing has taken place.

With the foregoing and other objects in view, there is provided, in accordance with the invention, a transport device for a register tape of an electric register mechanism having a housing containing a supply load unit into which a supply roller serving for unwinding the register tape is insertible, and a transport roller which, together with a contact pressure roller, grips a register tape running between both the transport roller and the contact pressure roller and passes it from the supply roller unit to and beyond a register element of the register mechanism for performing a recording on the register tape, the supply load unit being at least partly removable from the housing for inserting the supply roller therein, the supply roller and the contact pressure roller being spatially separated from one another during the removal of the supply load unit, comprising means defining a contact pressure surface, the register element being at the contact pressure surface, the transport roller, in operating position thereof, being located between the contact pressure roller and the contact pressure surface, the transport roller being shifted out of the operating position thereof when the supply load unit is removed at least partly from the housing, and the register tape pressed between the contact pressure roller and the contact pressure surface being freed therefrom.

The surprisingly simple construction of the transport device according to the invention is achieved quite contrarily to conventional technology, by providing a transport roller which is not fixed in position to the housing but rather, is movable. Thus, it is possible, due to the movement, preferably, of one roller, namely the transport roller, to produce two contact pressure locations. The first contact pressure location is formed by the transport roller together with the contact pressure roller, while the second contact pressure location lies between the transport roller on a contact pressure plane or surface. It is also possible to attain almost any possible looping of the register tapes around the transport roller and thereby effect a reliable transport. Because the recording or printing occurs, furthermore, directly at the transport roller, virtually no delay is produced until the record or print becomes visible.

In order to swing the transport roller away from the contact pressure roller, it is most expedient to fasten the transport roller in the removable supply load unit. Further, in accordance with the invention, means are provided for yieldingly pressing the transport roller and the contact pressure surface towards one another, the yielding pressure means being either a resilient suspension of the transport roller or a resilient yielding of the contact pressure roller and the contact pressure surface.

As mentioned hereinbefore, it is of advantage that the record or print be rapidly visible and, therefore, in accordance with another feature of the invention, the register tape engages the register element at a register line which, as viewed in transport direction of the register tape, is located behind a drive line formed in common by the transport roller and the contact pressure roller.

In accordance with an added feature of the invention, the register line is located on the transport roller.

In accordance with an additional feature of the invention, the register element per se forms the contact pressure surface and the register element is a thermal printing head resiliently supported and pressing against the transport roller, and including stop means for protecting the thermal printing head when the supply load unit is at least partly removed. The stop means hold the printing head in a position which ensure that a trouble-free run-up of the head onto the transport roller occurs when the supply load unit is reintroduced.

In accordance with yet another feature of the invention, the register element is a recording comb having respective resilient recording tines disposed directly behind a contact pressure part whereon the contact pressure surface is formed, the resilient recording tines being engageable with the register tape.

In accordance with yet an added feature of the invention, the transport roller and the contact pressure roller are of such dimensions and have such a mutual spacing and travel range with respect to one another that a looping over a given surface portion of the transport roller by the register tape is provided.

In accordance with yet a further feature of the invention, the transport roller has a surface maximizing adhesive characteristics thereof.

In accordance with yet an additional feature of the invention, the surface of the transport roller is rubber-like.

In accordance with still another feature of the invention, the contact pressure surface is formed of a friction-minimizing material.

In accordance with still an additional feature of the invention, the material forming the contact pressure surface is a Teflon-type material.

While the friction of the register tape at the transport roller is increased by a preferably rubber-like surface it must simultaneously be reduced at the contact pressure surface, for example, by a Teflon-layer, so as to ensure a reliable transport.

In accordance with still a further feature of the invention, the supply load unit is formed as a pivot member firmly connected via a pivot shaft with the housing, the pivot member together with the supply roller and the transport roller being swingable out of the housing, the contact pressure roller remaining in position thereof within the housing.

In accordance with again another feature of the invention, the supply load unit comprises a front plate closing the housing at the front thereof, the front plate having two opposing side plates secured thereto for carrying the supply roller and the transport roller.

In accordance with a concomitant feature of the invention, the supply load unit is a plug-in unit slidable with the supply roller and the transport roller into and at least partly out of the housing, and the contact pressure roller is carried on free arms of a V-shaped swivel bracket so that the swivel bracket swings the contact pressure roller into the operating position thereof when the plug-in unit is slid into the housing.

Due to the somewhat complicated construction of the plug-in unit, the area of the front plate is considerably reduced.

Other features which are considered as characteristic for the invention are set forth in the appended claims.

Although the invention is illustrated and described herein as embodied in a transport device for a register tape of an electric register mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments, when read in connection with the accompanying drawings, in which:

BRIEF DESCRIPTION OF THE DRAWINGS

FIG. 1 is a diagrammatic elevational view, partly in section, of one embodiment of the transport device for register tapes of an electric recording or registering mechanism having, in swung-out condition, a supply load unit shaped as a swivel member;

FIG. 2 is a view like that of FIG. 1 of the transport device with the supply load unit in swung-in position;

FIG. 3 is a view similar to that of FIG. 1 of another embodiment of the transport device having, drawn-out condition, a supply load unit shaped as a plug-in unit;

FIG. 4 is another view like that of FIG. 3 with the supply load unit partly inserted in an intermediate condition.

DETAILED DESCRIPTION OF THE INVENTION

Figure 5:
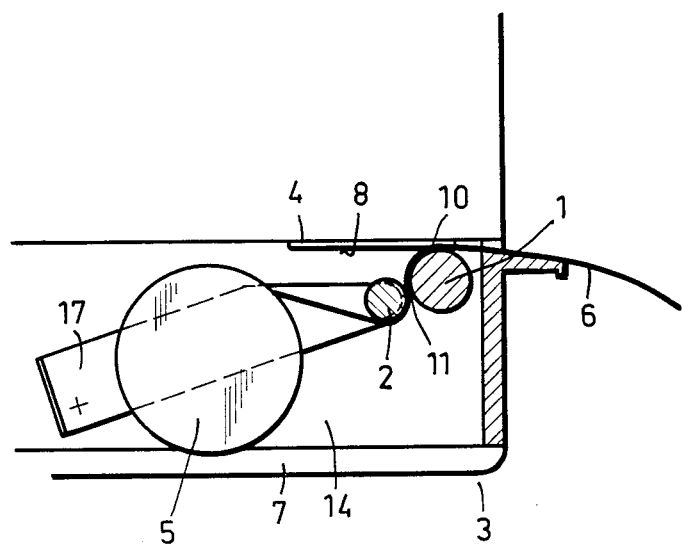
FIG. 5 is yet another view like that of FIG. 3 with the supply load unit in fully inserted condition.

Referring now to the figures of the drawing, the transport device has a supply load unit, which is formed as a swivel member in FIGS. 1 and 2 and as a plug-in unit in FIGS. 3 to 5, and is made up mainly of a transport roller 1, a contact pressure roller 2, a transport load or charge 3, a registering element 4 and a supply roller 5. Beneath or directly adjacent the registering element 4, there is located a contact pressure surface 8. As shown in FIG. 2, when the transportation supply load 3 is inserted, the transport roller 1 lies between the contact pressure roller 2 and the contact pressure surface 8. A register tape 6 starts out from the supply roller 5, loops halfway around the two rollers 2 and 1 successively, passes the register element 4 and moves out of the housing 7 of the transport device.

The transport or supply load 3 is formed of a front plate 13 and two side plates, wherein bearings are formed which serve for receiving the transport roller 1 and the supply roller 5.

According to FIGS. 1 and 2, the bearing for the supply roller 5 is formed as a groove 18 in the transport load 3 formed as a swivel member. The groove 18 is open at an end thereof facing in a direction which permits relatively easy insertion of the supply roller 5.

In contrast with that of FIGS. 1 and 2, the contact pressure roller 2 of FIGS. 3 to 5 is not firmly connected to the device housing 7, but rather to free arms of a U-shaped swivel bracket 17. When the transport or supply load 3 is inserted, this swivel bracket 17 is forced downwardly and the contact pressure roller 2 is pressed against the transport roller 1. Due to this technology, the dimension of the front plate 13 can be reduced considerably.

In both of the cases demonstrated by the illustrated and aforedescribed embodiments, the insertion of a new supply roller 5 into the transport or supply load 3 is exceptionally simple because, when the transport load 3 is drawn out, the free end of the register tape 6 need only be drawn over the transport roller 1 and the transport load 3 can then be pushed back into the housing 7. The contact pressure roller 2 ensures that an adequately large looping angle is produced at the transport roller 1 covered with rubber which is driven via a non-illustrated gear. The thermal printing head 4 forming the contact pressure surface 8 is pressed by non-illustrated springs against the register tape. When the supply load unit or transport load 3 is drawn out, the thermal printing head 4 is held by a suitably adjusted stop in a position which ensures a trouble-free run-up of the thermal printing head 4 onto the transport roller 1 when the transport or supply load 3 is inserted.

The introduction of a supply roller 5 is thus exceedingly simple, and all handles or grips can be provided at the front side. No access to the rear side and none upwardly to an opening flap are thus required. Due to the use of a register tape without edge perforations, fitting thereof into the teeth of transport gears can further be dispensed with.

The foregoing is a description corresponding in substance to German application No. P 33 34 217.2, dated Sept. 22, 1983, the International priority of which is being claimed for the instant application, and which is hereby made part of this application. Any material discrepancies between the foregoing specification and the aforementioned corresponding German application are to be resolved in favor of the latter.

I claim:

1. Transport device for a register tape of an electric register mechanism having a housing containing a supply load unit which is a supply roller service for unwinding the register tape is insertable; and a transport roller which, together with a contact pressure roller, grips a register tape running between both the transport roller and the contact pressure roller and passes it from the supply roller unit to and beyond a register element of the register mechanism for preforming a recording on the register tape; the supply load unit being at least partly removable from the housing for inserting the supply roller therein; the supply roller and the contact pressure roller being spatially separated from one another during the removal of the supply load unit; the transport device further comprising means defining a contact pressure surface, the register element being at said contact pressure surface; the transport roller, in operating position thereof, being located between the contact pressure roller and said contact pressure surface; said transport roller being shifted out of said operating position thereof when the supply load unit is removed at least partly from the housing, and the register tape pressed between the contact pressure roller and the contact pressure surface being freed therefrom; the supply load unit being a plug-in unit slidable with the supply roller and the transport roller into and at least partly out of the housing, and the contact pressure roller being carried on free arms of a U-shaped swivel bracket so that said swivel bracket swings the contact pressure roller into the operating position thereof when said plug-in unit is slid into the housing.

* * * * *